United States Patent [19]
Dore et al.

[11] Patent Number: 5,893,480
[45] Date of Patent: Apr. 13, 1999

[54] CLOSURE COVER WITH PLURALITY OF STOP ELEMENTS MOVABLE THROUGH OPEN SPACES IN FINGERS SUPPORTING THE STOP MEMBERS

[75] Inventors: Pascal Dore, Haguenau; Jean-Luc Rene Georges Klein, Ringendorf, both of France

[73] Assignee: TRW Carr France, France

[21] Appl. No.: 08/924,226

[22] Filed: Sep. 5, 1997

Related U.S. Application Data

[63] Continuation of application No. 08/652,168, May 23, 1996, abandoned, which is a continuation of application No. 08/226,295, Apr. 11, 1994, abandoned.

[30] Foreign Application Priority Data

Apr. 23, 1993 [FR] France .................. 93 04838

[51] Int. Cl.[6] ............................................ B65D 39/00
[52] U.S. Cl. ................ 220/784; 215/355; 220/787; 220/780; 220/795
[58] Field of Search ..................... 220/780, 784, 220/787, 789–792, 795, 796, 799–804, 608, 623, 355, DIG. 19; 215/364, 355

[56] References Cited

U.S. PATENT DOCUMENTS

| | | | |
|---|---|---|---|
| 1,773,513 | 8/1930 | Brady | 215/364 |
| 2,194,437 | 9/1940 | Collins | 220/203.09 |
| 3,278,066 | 10/1966 | George et al. | 220/307 X |
| 4,091,962 | 5/1978 | Van Buren et al. | 220/307 X |
| 4,298,132 | 11/1981 | Galer | 220/623 X |
| 4,363,420 | 12/1982 | Andrews | 220/787 |
| 4,504,009 | 3/1985 | Boik et al. | 220/307 X |
| 4,572,390 | 2/1986 | Grittmann | 220/307 X |
| 4,588,104 | 5/1986 | Danico | 220/307 X |
| 4,588,105 | 5/1986 | Schmitz et al. | 220/307 X |
| 4,747,511 | 5/1988 | Dutt et al. | 220/307 |
| 5,292,024 | 3/1994 | Koefelda et al. | 220/608 |

*Primary Examiner*—Stephen K. Cronin
*Assistant Examiner*—Robin A. Hylton
*Attorney, Agent, or Firm*—Fay, Sharpe, Beall, Fagan, Minnich & McKee, LLP

[57] ABSTRACT

A closure cover for panel openings is formed of plastic material and comprises a cover cap carrying several resilient elastic fingers that extend from a lower side of the cover cap. Each finger carries a stop element for penetrating into the panel opening and retaining the cover in place. The resilient fingers (3) are each comprised of two small resilient bars (6, 7) between which is arranged the stop element (8) likewise designed in the form of a small elastic cross piece. The stop element (8) forms a hook with a connection area (9) located at a predetermined angle relative to the bars (6, 7) and a stop area (5) connected to the connection area (9).

4 Claims, 2 Drawing Sheets

CLOSURE COVER WITH PLURALITY OF STOP ELEMENTS MOVABLE THROUGH OPEN SPACES IN FINGERS SUPPORTING THE STOP MEMBERS

This is a continuation of U.S. application Ser. No. 08/652,168, filed May 23, 1996, now abandoned which is a continuation of U.S. application Ser. No. 08/226,295, filed on Apr. 11, 1994, now abandoned.

BACKGROUND OF THE INVENTION

The invention relates to a closure cover of synthetic or plastic material including a cover cap having several resilient fingers arranged on the lower side thereof. Each finger has a stop area or retaining portion located at a predetermined distance from the lower side of the cover cap for extending through a support opening.

According to the current state of the art, a closure cover of the type is already known that comprises three resilient fingers distributed over its periphery (German Printed Specification 34 42 109). The resilient fingers are relatively rigid due to a supplementary support and the rest area is, moreover, of compact design. Because of this circumstance, the sealing effect of this known closure cover proves to be inadequate.

Likewise, other known closure covers (German Petty Patent 19 59 426, British Patent 734 857, and German Printed Specification 23 14 021) are similarly designed and are, consequently, not capable of sealing a support opening with the maximum tightness.

Consequently, there is posed, for the present invention, the problem of creating a sealing plug or closure cover of the type initially mentioned, by which one can obtain an improved seal effect despite simple construction.

SUMMARY OF THE INVENTION

That objective is achieved according to the invention in that each resilient finger is made up of two resilient small bars. Between the bars there is arranged a stop or retaining element designed in the form of an elastic small bar. The stop element forms a hook with a connection area located at an angle relative to the elastic small bars. Because of this novel configuration, one obtains a closure cover where the resilient fingers are quite solid but retain their elasticity at the point where the stop element engages with the periphery of a support opening. Because of that relationship, the cover cap resiliently supports itself against the support opening. Thus in simple fashion an improved sealing effect is achieved.

In another embodiment of the invention, the stop element can extend parallel to the adjoining small bars at a radially outward location. Moreover, the connection area of each resilient finger can be arranged to form an acute angle relative to the longitudinal axis of the cover cap with the small bars forming the stop elements extending parallel to the longitudinal axis of the cover cap.

In order to improve the sealing effect, the resilient fingers can be arranged at a predetermined spacing in relationship to the exterior periphery at the level of the lower side of the cover cap and a sealing element can be arranged between the exterior periphery and the resilient fingers. The sealing element can, for example, be made of a material which is deformable under the effect of heat to produce an additional sealing effect. Furthermore, the sealing element can be encased in a groove that is recessed on the lower side of the cover cap.

In order to obtain a uniform compression and sealing effect, one can judiciously distribute several resilient fingers about the periphery by uniting them with the shape of the lower side of the cover cap. In order to increase the stability, the lower side of the cover cap in the internal area of the resilient fingers can comprise a circular small collar, which for example, will be equipped with reinforcement ribs.

BRIEF DESCRIPTION OF THE DRAWINGS

The above and other objects and advantages will become apparent from the following description when read in conjunction with the accompanying drawings wherein.

DETAILED DESCRIPTION OF THE PREFERRED EMBODIMENTS

Figure 1:
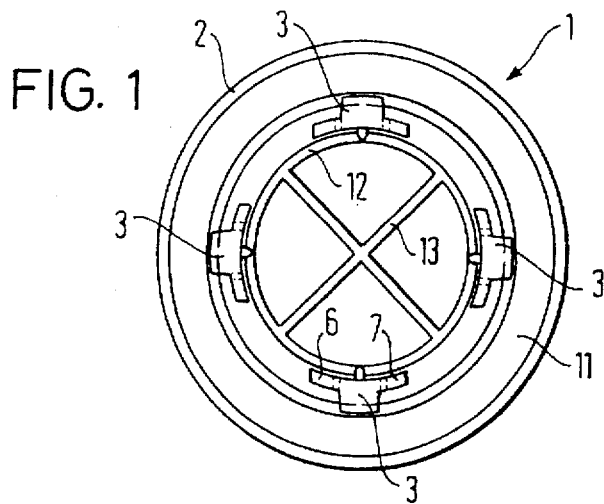
FIG. 1 is a bottom view of a closure cover formed in accordance with a preferred embodiment.
Figure 2:
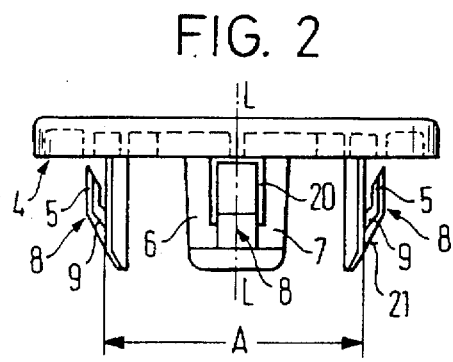
FIG. 2 is a side view of the closure cover according to FIG. 1.

Referring more particularly to the drawings wherein the showings are for the purpose of illustrating a preferred embodiment of the invention only, and not for the purpose of limiting same, FIGS. 1 and 2 best show the overall arrangement of the closure cover 1 formed of a synthetic material such as a plastic and comprising a cover cap 2 having several resilient fingers 3 arranged on the lower side 4.

In the present embodiment, there are provided four of the resilient fingers 3 distributed at uniform circumferential spacing about the periphery. These resilient fingers each present, at a certain distance in relationship to the lower edge of the closure cover, a stop or retaining area 5 for penetrating through the support opening (which is not represented in detail) that is intended to be sealed by the closure cover.

As is specifically apparent from FIG. 2, each resilient finger 3 is comprised of two small bars or resilient struts 6 and 7, between which there is arranged a rest element 8 that is also designed in the form of an elastic bar or strut. The rest element 8 forms a hook with a connection area 9 at a predetermined angle in relationship to the resilient small bars 6, 7 and the bent stop area 5 connected to the connection area 9. The point of the stop area 5 is directed here against the lower side 4 of the cover cap 2 and is situated at a predetermined short distance from the same.

It is apparent from FIG. 2 that the stop area 5 arranged on the resilient bar is surrounded by a continuous opening area or traversing channeling 20. Thus, the respective stop areas 5 can penetrate or deflect radially inward by resilient compression up to the plane of the resilient small bars 6, 7, in such manner that the respective distance A of the resilient fingers concerned, can appreciably correspond to the diameter of the support opening, which is not shown in detail.

The stop area 5 extends for a distance parallel to the adjacent small bars 6, 7, while the connection area 9 of each resilient finger 3 is arranged at an acute angle relative to the longitudinal axis L—L of the cover cap. In this manner, one can easily place the closure cover according to the invention in a support opening, thanks to the chamfer 21 of the four resilient fingers. FIG. 2, moreover, shows that the small bars 6, 7 extend parallel to the longitudinal L—L axis of the cover cap 2.

Figure 3:
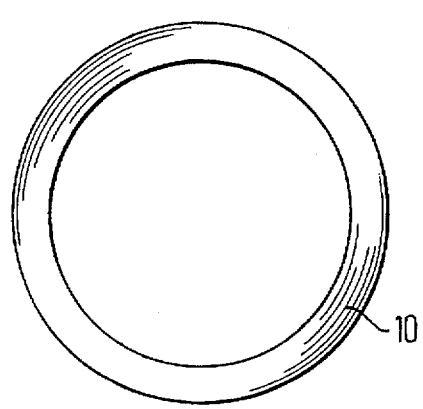
FIG. 3 is a bottom view of a sealing ring used in the closure cover of FIG. 1.
Figure 4:
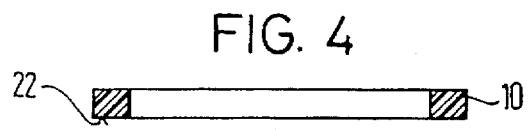
FIG. 4 is a median cross-section of the sealing ring according to FIG. 3.

As best seen in FIG. 1, the resilient fingers 3 are arranged at a certain distance from the exterior periphery at the level of the lower side of the cover cap 2 and embrace the contour of same. Between the exterior periphery of the cover cap 2 and the resilient fingers 3 there is arranged a circular groove 11 which serves to receive a sealing element 10 designed in the form of a sealing ring shown in FIGS. 3 and 4. The sealing ring 10 can be made from a material that is deformable under the effect of heat to further improve the sealing.

Figure 5:
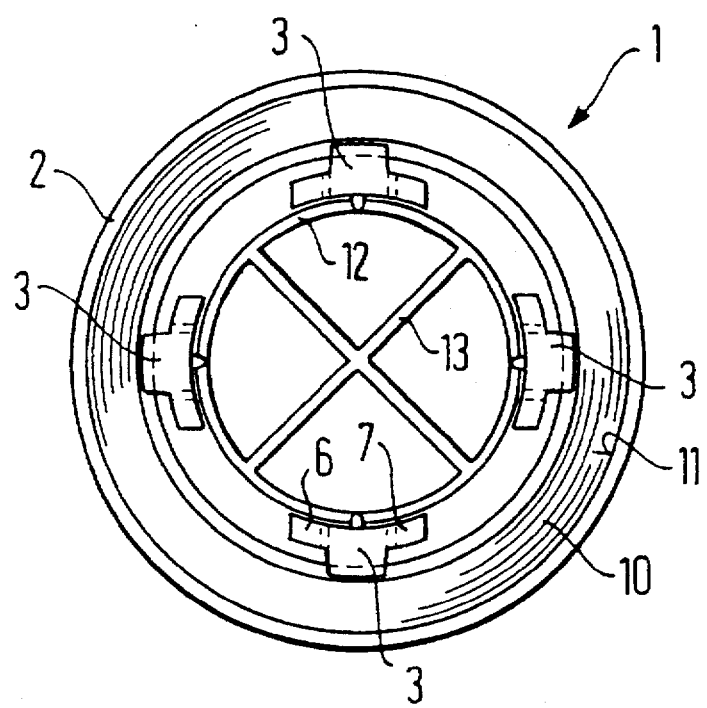
FIG. 5 is a bottom view of the closure cover according to the invention equipped with sealing ring; and, FIG. 6 is a side view of the closure cover equipped with the sealing ring.
Figure 6:
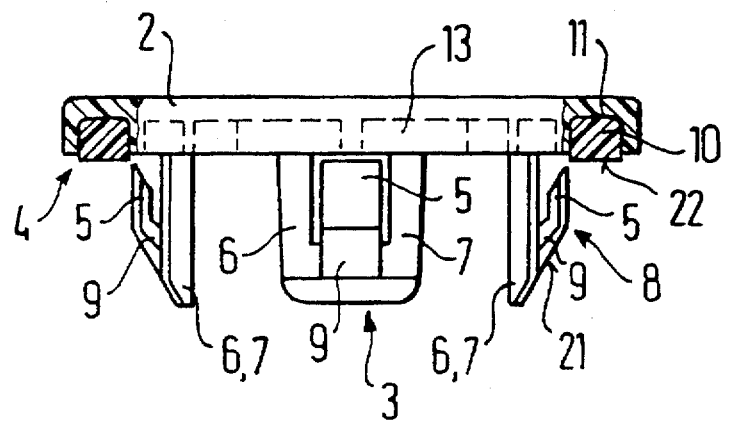

FIGS. 5 and 6 indicate the assembled unit with the sealing element 10 arranged in position. As is apparent, the annular sealing element 10 lodges itself in groove 11 at the level of the interior side 4 of the cover cap 2. The frontal surface 22 of sealing element 10 is here directed in opposition to the point of the stop area 5.

According to FIG. 6, one can have a configuration so that prior to mounting of the plug 1, the frontal surface 22 is situated on the radial exterior of the stop area 5. In return, if the stop areas 5 of the resilient fingers 3 penetrate in the periphery of a support opening, not represented in detail, the resilient small bars forming the stop element 8 are pushed by the resilient small bars 6, 7 in a manner that the point of the respective stop area 5 is located below the front surface 22 of the sealing element 10.

In order to provide supplemental stability to the assembled device, the cover cap 2 can present on the lower side 4 a small circular collar 12 on the internal area of the resilient fingers 3. The small circular collar 12 can be equipped with reinforcement ribs 13.

In general, thanks to the special design of the closure 1 according to the invention, one obtains a form which is simple in its construction permitting, however, to obtain, because of the presence of resilient small bars 6, 7, and the stop element in form of a small bar 8 with consecutive stop area 5, an excellent sealing effect. This sealing effect is improved even more if one utilizes a sealing element 10.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A closure cover for covering an associated support opening when mounted in the associated support opening, the closure cover comprising:

a) a plastic cover cap having an outer periphery and a lower face engaging a first surface peripheral to said associated support opening when the closure cover is mounted in the associated support opening;

b) a plurality of resilient plastic fingers projecting from the lower face at locations radially and circumferentially spaced relative to the center of the lower face but radially inward of the outer periphery, each resilient finger comprising a spaced pair of small elastic bars extending downwardly from the lower face and joined at their lower ends by a small elastic bar cross-piece, a separate stop element connected with each cross-piece engaging a second surface peripheral to said associated support opening when the closure-cover is mounted in the associated support opening, the separate stop element connected with each cross-piece and including a first portion extending radially outwardly from the cross-piece in an angular direction toward the cover cap and a second portion extending generally parallel to the pair of small elastic bars and terminating at an end edge spaced from the lower face of the cover cap, said end edge engaging the second surface peripheral to said associated support opening when the closure is mounted in the associated support opening, and an open space between each pair of small elastic bars into which the associated stop element can be radially deflected; and, c) a circumferentially extending seal element carried on the lower face between the resilient fingers and the outer periphery engaging the first surface peripheral to the associated support opening when the closure cover is mounted in the associated support opening.

2. A closure cover as defined in claim 1 wherein the seal element is received in a circumferential groove formed in the lower face of the cover cap.

3. The closure cover as defined in claim 1 including a circular collar located on the lower face of the cover cap radially inwardly of the resilient fingers.

4. A closure cover as defined in claim 1 further including reinforcement ribs disposed on the cover cap radially inwardly of the resilient fingers.

* * * * *